United States Patent [19]
Budde et al.

[11] Patent Number: 5,300,011
[45] Date of Patent: Apr. 5, 1994

[54] AUTOMATIC AIRBAG FOLDING APPARATUS AND METHOD

[75] Inventors: William J. Budde; Louis A. Fanty, both of Dayton; Scott F. Mason, New Carlisle; James E. Murphy, Bellbrook, all of Ohio

[73] Assignee: The Omega Company, Inc., Dayton, Ohio

[21] Appl. No.: 960,944

[22] Filed: Oct. 14, 1992

[51] Int. Cl.$^5$ ............................................. B60R 21/16
[52] U.S. Cl. ................................... 493/405; 493/451; 493/458
[58] Field of Search ............... 493/243, 244, 256, 267, 493/314, 405, 406, 450, 458, 451, 940; 280/743; 53/429

[56] References Cited

U.S. PATENT DOCUMENTS

3,839,947 10/1974 Kornas et al. .
3,839,948 10/1974 Putti et al. .
4,235,453 11/1980 Lawson et al. .
4,351,544 9/1982 Ross .
4,903,986 2/1990 Cok et al. .
5,022,675 6/1991 Zelenak, Jr. et al. .
5,162,035 11/1992 Baker .
5,163,893 11/1992 Hara et al. .

Primary Examiner—Jack Lavinder
Attorney, Agent, or Firm—Killworth, Gottman Hagan & Schaeff

[57] ABSTRACT

A method and apparatus for automatically folding an airbag is provided whereupon an airbag is positioned securely over receiving tooling, and a plurality of portions of the airbag are automatically manipulated in a plurality of directions, respectively, to place the airbag in a folded condition. The apparatus includes a processor to automatically operate means for manipulating the airbag. The apparatuses for manipulating the airbag preferably include an apparatus for fanfolding a portion of an airbag, an apparatus for folding over a portion of an airbag, and at least one hold-down mechanism to receive portions of an airbag. The various apparatuses for manipulating the airbag can be variously combined in accordance with the present invention to automatically prepare airbags of various types in various folding patterns.

14 Claims, 11 Drawing Sheets

AUTOMATIC AIRBAG FOLDING APPARATUS AND METHOD

BACKGROUND OF THE INVENTION

The present invention relates to the preparation of airbags for installation in vehicles and, in particular, to an apparatus and method for automatically folding airbags.

The use of airbags for driver and passenger restraint during vehicle impact has grown increasingly popular. At present, few standards exist, and various shapes, sizes and folding patterns have been developed to prepare airbags for installation and use. The unusual airbag shapes which have been developed and the demands of the application have presented problems which have required novel airbag folding patterns.

Typically, airbags are circular, oval or pillow-shaped, and are mounted in steering wheels, steering columns, and dashboards of automobiles by means, such as a mounting flange, through which inflation is achieved. So located, the limited space available demands that the airbags be folded into a small volume. However, the instantaneous nature of their intended use requires that airbags unfold and inflate rapidly without binding. Further, the force of inflation has been used by some to burst the rupturable airbag enclosure. Thus, novel folding patterns have been developed to provide outward thrust upon initial inflation, while enabling smooth, rapid and complete inflation.

Currently, time-consuming manual methods are required to fold airbags into these patterns. To reduce manufacturing costs, some fixed or partially automated jigs have been developed to assist in folding. However, to date, no completely automated airbag folding apparatuses have been successfully developed, and unit costs are high. Accordingly, the need remains for a completely automatic apparatus and method for producing folded airbags to enable higher production rates and lower manufacturing costs relative to manual and semi-manual folding methods.

SUMMARY OF THE INVENTION

That need is satisfied by the present invention wherein an automatic airbag folding apparatus and method is provided to produce a folding pattern meeting the needs of airbag installations.

In accordance with the present invention, a method for folding an airbag is provided including the steps of positioning an airbag securely over means for receiving, automatically manipulating a plurality of portions of the airbag in a plurality of directions, respectively, to place the airbag in a folded condition, and removing the airbag in folded condition from the receiving tooling for use in a vehicle.

The step of automatically manipulating can include several individual steps or combinations thereof. In particular, the step of automatically manipulating preferably includes automatically fanfolding first and second portions of the airbag inward in first and second directions, respectively, generally towards the means for receiving. As well, the step of automatically manipulating preferably further includes automatically folding over third and fourth portions of the airbag towards the receiving tooling in third and fourth directions, respectively.

The present invention, thus, provides method steps by which fanfolding and folding over of portions of an airbag may be achieved. While the preferred embodiment includes only fanfolding and folding over, the method steps disclosed in accordance with the present invention may be variously combined to automatically prepare airbags of various types in various folding patterns.

In a further aspect of the present invention, an apparatus is disclosed which includes a plurality of means for manipulating portions of an airbag automatically in a plurality of directions to automatically produce a folded airbag. The means for manipulating preferably includes means for fanfolding a portion of an airbag, means for folding over a portion of an airbag, and at least one hold-down mechanism to receive portions of an airbag. The apparatus further includes a processor means to automatically operate the means for manipulating.

More specifically, in the preferred embodiment of the apparatus, the means for fanfolding includes gripper finger assemblies and opposing fixed blades or fingers which first produce and then maintain a portion of the airbag in a fanfolded condition. Means for inflating the airbag are further provided which coact with the means for fanfolding to produce an additional tuckfold adjacent the fanfolded portion of the airbag. Preferably two means for fanfolding are provided, and fanfold first and second portions of the airbag towards the center of the airbag. Further, in the preferred embodiment, the means for folding over and the hold-down mechanism coact to produce both a tuck and fold in third and fourth portions of the airbag. Sequential automatic operation of these means completely and automatically folds an airbag into a small volume. Preferably, the means for receiving includes receiving tooling with automatic clamping means which secure the airbag by the airbag mounting flange to the apparatus.

The present invention thereby provides a method and apparatus for automatically folding airbags of various shapes and sizes into various folding patterns of small volume for installation and use. As a result, the present invention enables manufacturers to enjoy higher production rates and lower manufacturing costs in the preparation of airbags.

Accordingly, it is an object of the present invention to provide a method and apparatus which may be applied to automatically fold airbags of various shapes and sizes into various folding patterns for installation and use. It is a further object of the present invention to provide a method and apparatus which folds airbags into small volumes from which they may nearly instantaneously unfold and inflate. It is a still further object of the present invention to provide an apparatus and method whereby airbags may be automatically folded to reduce manufacturing and production costs relating to the installation of airbags in vehicles.

These and further objects and features of the present invention will become apparent from the drawings, detailed description and claims which follow.

DETAILED DESCRIPTION OF THE PREFERRED EMBODIMENTS

Figure 1:
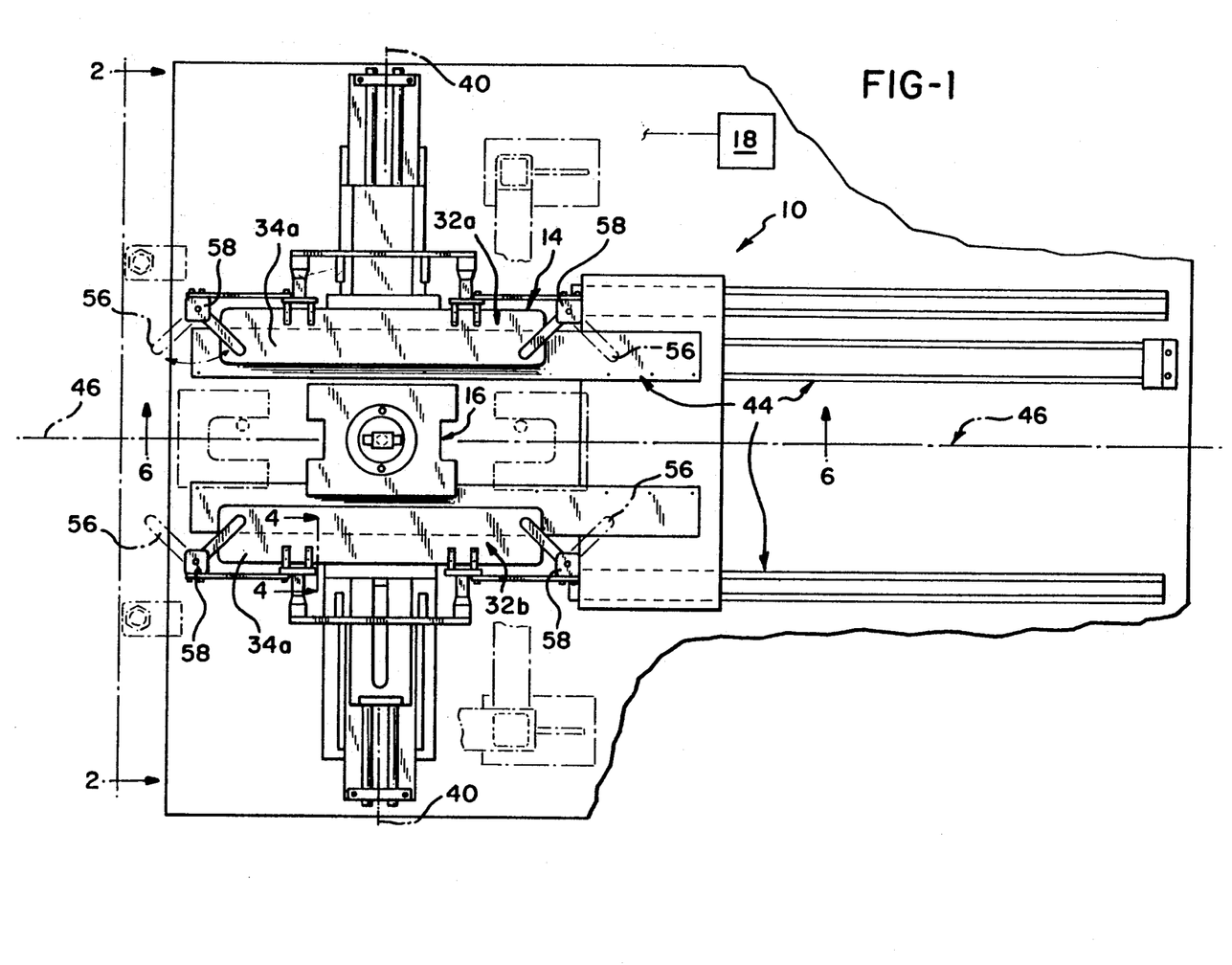
FIG. 1 is a plan view of the apparatus of the present invention.

An apparatus 10 for folding an airbag 12 in accordance with the present invention is shown in FIGS. 1-10. In FIG. 1, the apparatus 10 for folding shown includes a supporting frame 14 and means 16 for receiving an airbag 12 in the frame 14. Means for manipulating the airbag 12 and processor means 18 for automatically operating the means for manipulating are provided to automatically fold an airbag 12 secured in the means 16 for receiving.

The means for manipulating of the present invention manipulate a plurality of portions of an airbag 12 in a plurality of directions to automatically fold airbag 12. The means for manipulating preferably includes means 30 for fanfolding a portion of an airbag 12 (FIGS. 2 and 3), means 70 for folding over a portion of an airbag 12 (FIGS. 6 and 7), and at least one hold-down mechanism 60 to receive portions of an airbag 12 (FIGS. 4 and 5). The means for manipulating of the present invention may be variously combined to automatically prepare airbags 12 of various types in various folding patterns.

Figure 2:
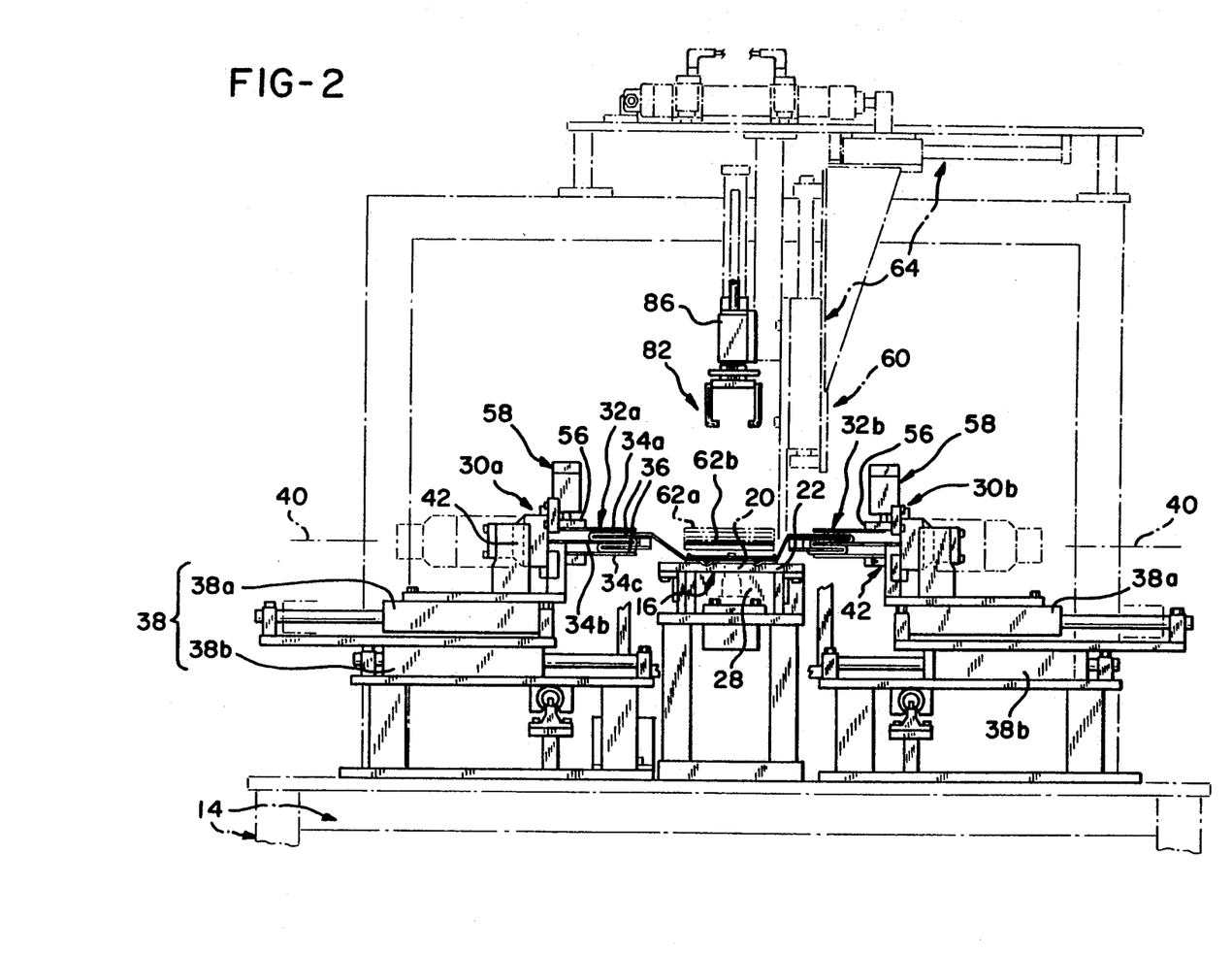
FIG. 2 is an end elevational view of the apparatus of the present invention taken along line 2—2 in FIG. 1.
Figure 9A:
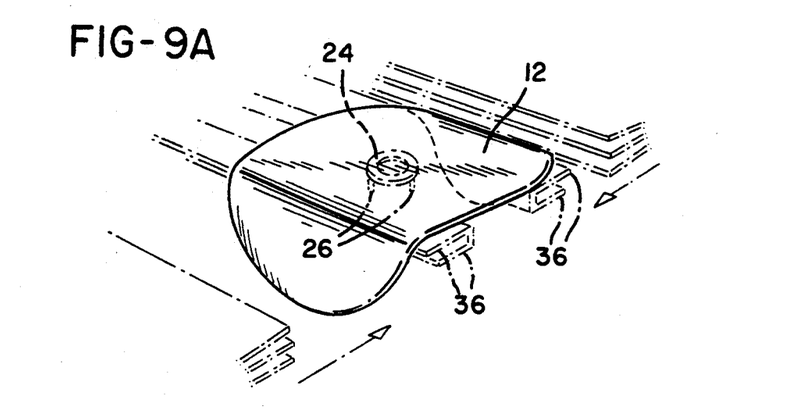
FIGS. 9A-9I are a series of detail schematic perspective views of the present invention showing the airbag at different stages of folding.
Figure 11:
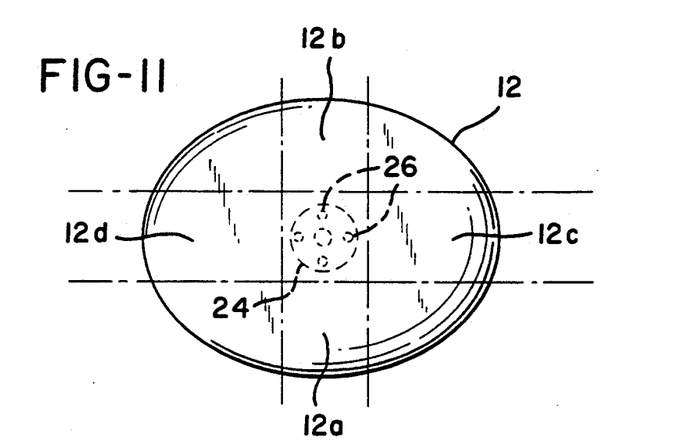
FIG. 11 is a plan view of a typical airbag.
Figure 12:
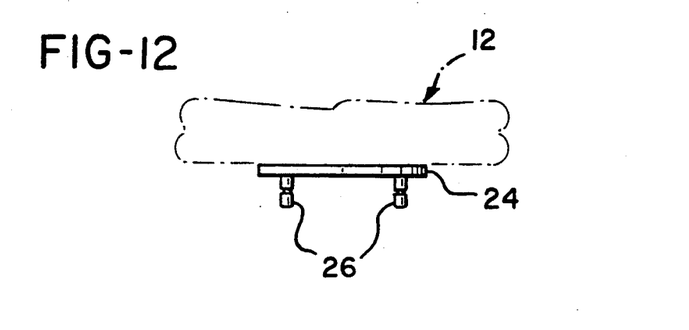
FIG. 12 is side elevational view of a folded airbag showing the mounting flange and studs.

Referring to FIG. 1, the processor means 18 of the present invention is operatively connected to the means for manipulating. The processor means 18 is preferably an industrial programmable controller which is commercially available. As representatively shown in FIGS. 1 and 2, the means 16 for receiving comprises receiving tooling or a plate, and preferably includes an aperture 20 through which air pressure and vacuum may be communicated to the airbag 12 through an opening therein. The means 16 for receiving is also shown in FIG. 2, recessed relative to the level of surrounding elements. At least one locating hole 22 provided in the means 16 for receiving receives a stud 26 extending from the airbag mounting flange 24 (see FIGS. 11 and 12). Automatic means 28 for clamping secure the airbag 12 on the means 16 for receiving such that the opening in the airbag 12 is aligned with the aperture 20. Automatic means 28 for clamping preferably clamps onto stud 26 or the mounting flange 24, shown best in FIG. 12. The automatic clamping means 28 is, for example, an air operated parallel gripper model RP100 available from Robohand, Inc., Easton, Conn. The means 16 for receiving thereby secures the airbag 12 in position for folding, as illustrated in FIG. 9A.

Figure 3:
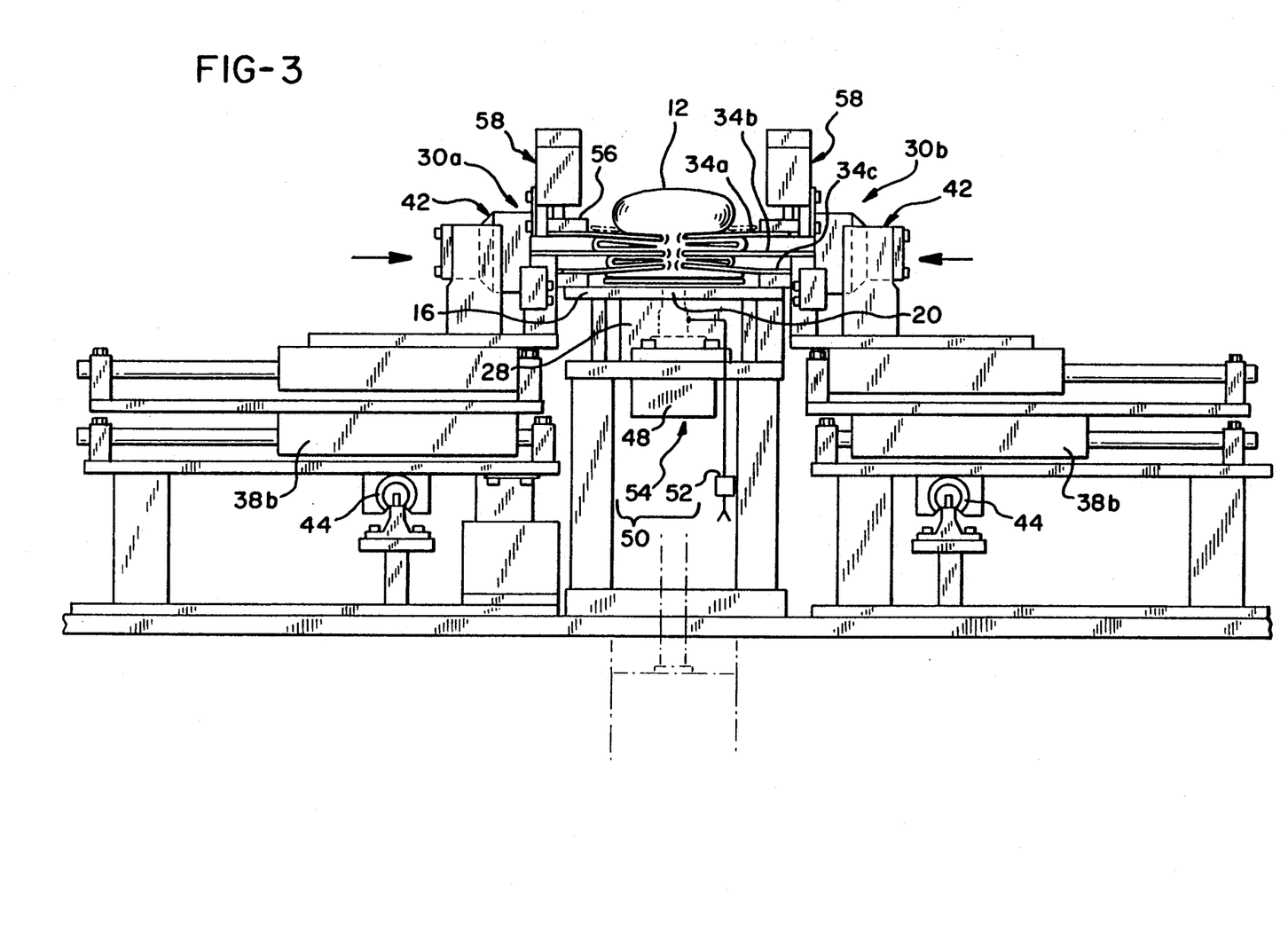
FIG. 3 is an end elevational view of the apparatus of the present invention taken along line 2—2 in FIG. 1.
Figures 4, 5:
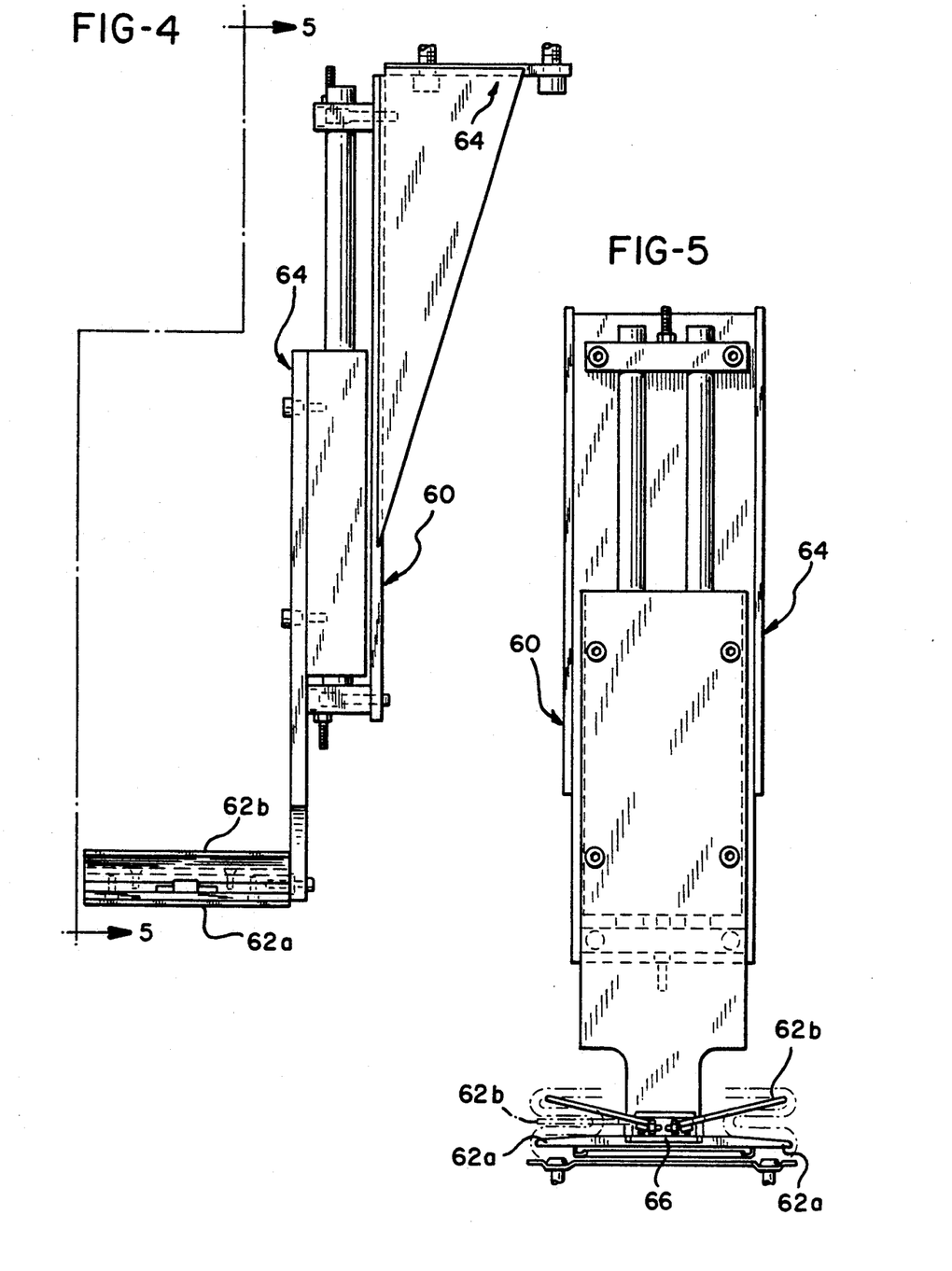
FIG. 4 is a detail end elevational view of the center hold-down mechanism of the present invention taken along line 4—4 in FIG. 1.
FIG. 5 is a detail side elevational view of the center hold-down mechanism of the present invention taken along line 5—5 in FIG. 4.
Figure 9B:
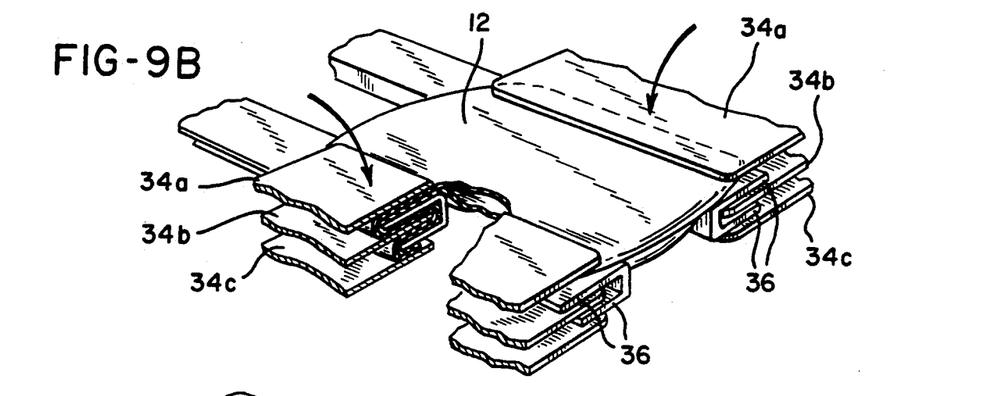

Referring now to FIGS. 2, 3 and 9B, the preferred means 30 for fanfolding are shown, which include a gripper finger assembly 32 having a plurality of gripper fingers 34, preferably three gripper fingers. The means 30 for fanfolding further includes at least one opposing finger 36, preferably two, in opposing relationship with the gripper fingers 34. The gripper fingers 34 and opposing finger(s) 36 are generally parallel rectangular plates extending along the length of a portion of the airbag 12, as shown in FIG. 1. Preferably, two opposing fingers 36 are of unequal width, and form the body of a U-channel. Means 38 for positioning the gripper finger assembly 32 along a first axis 40, also shown in FIG. 1, moves the gripper fingers 34 from a first position shown in phantom in FIG. 2 to a second position in alternating relationship with the opposing finger(s) 36, as also shown in FIG. 2. As the gripper fingers 34 and opposing finger(s) 36 are on opposite sides of the airbag 12, the motion of gripper fingers 34 engages a portion 12a of the airbag 12 in a fanfolded position therebetween. Preferably, first and second means 30a and 30b for fanfolding are provided to fanfold first and second portions 12a and 12b of the airbag 12 in first and second directions, respectively, parallel to first axis 40, and generally towards the means 16 for receiving. The means 38 for positioning preferably includes first and second air powered slides 38a and 38b, and may further include channels or rails on which first and second gripper finger assemblies 32a and 32b may be slidably supported.

The means 30 for fanfolding further includes means 42 for closing at least one of the gripper fingers 34 to maintain the fanfold formed in the portion 12a of airbag 12. Shown in FIGS. 1-3, such means 42 for closing are preferably air operated clamps, such as model RP25 clamps from Robohand, Inc., Easton Conn. Preferably, the gripper finger assembly 32 includes three gripper fingers 34a-34c, a centrally located fixed gripper finger 34b, and two movable gripper fingers 34a and 34c which are operated by the means 42 for closing. Preferably, two opposing fingers 36 of different widths are provided for insertion in alternating relationship between the gripper fingers 34a-34c.

Referring to FIGS. 1 and 2, the means 30 for fanfolding further includes means 44 for moving the opposing finger(s) 36 along a second axis 46 shown in FIG. 1 into and out of opposing relationship with the gripper finger assembly 32. Preferably, the first and second axes 40 and 46 are generally at right angles. The means 44 for moving the opposing finger(s) comprise air cylinders or air drives, and rails on which the opposing finger(s) 36 are slidably mounted.

Referring now to FIG. 3, the means 30 for fanfolding further includes means 48 for inflating and means 50 for deflating the airbag 12 coacting therewith. The means 48 for inflating, preferably, is a blower, capable of producing approximately 1.9 psig of air pressure at high volumes relative to the airbag, such as a model R3105-12 blower from Gast Manufacturing Corp., Benton Harbor, Mich. The blower is operated at 30-40% of its pressure capability, i.e. at approximately 0.6 to 0.8 psig. The air pressure is supplied through aperture 20 in mounting flange 24 (see FIG. 9A) to the airbag 12. The means 50 for deflating may simply comprise an automatic vent valve 52, but preferably includes both a vent valve 52 for initial pressure release, and a vacuum source 54, such as the blower of the means 48 for operating, operated in reverse. For example, the Gast model R3105-12 blower is capable of producing approximately 1.8 psig vacuum (approximately 12.9 psia), and again is preferably operated at 30-40% of capacity. When using a vacuum source 54 to remove air from airbag 12, the vent valve 52 is closed.

Shown best in FIG. 1, the gripper finger assembly 32 also includes at least one extendable finger 56, and means 58 for extending the extendable finger 56 from one of the gripper fingers 34, for example gripper finger 34a, as shown. The extendable finger 56 rotates from a first position to a second position shown in phantom to smooth out and slightly lengthen the tuckfold formed by the finger 34a. See also FIG. 9D. The means 58 for extending is preferably a commercially available air operator.

Figure 9C:
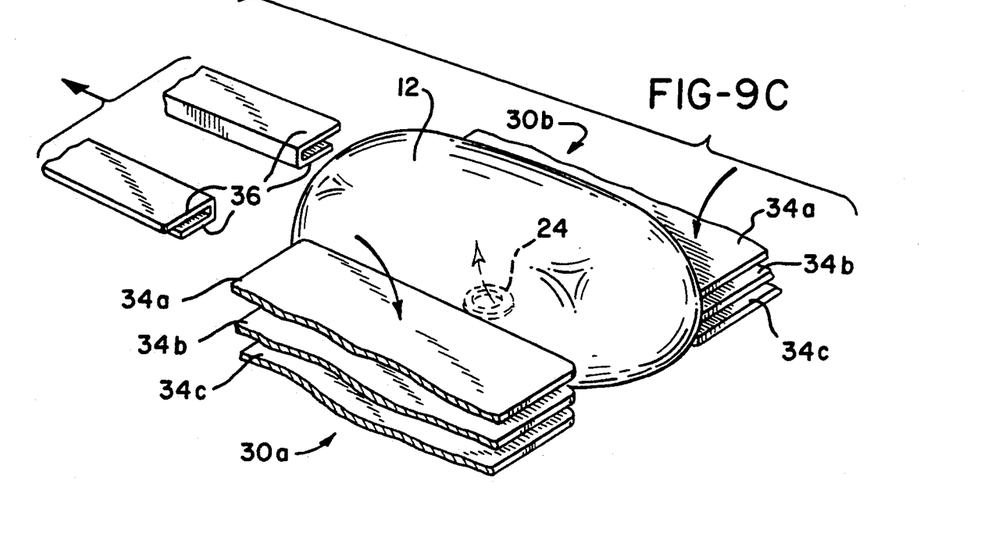
Figure 9D:
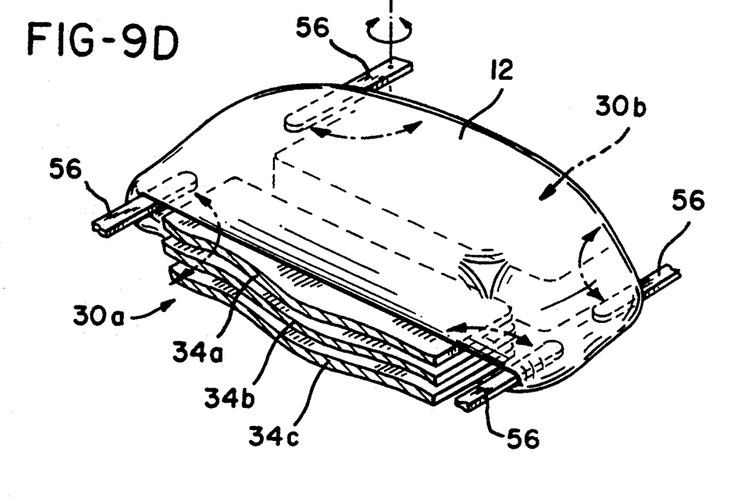

As shown in FIGS. 3, 9C and 9D, with the opposing fingers 36 moved away along axis 46, and the gripper fingers 34 closed, the means 30 for fanfolding coacts with the means 48 for inflating the airbag 12 to produce an additional tuckfold by moving the fanfolded portion of the airbag 12 towards the means 16 for receiving. In so doing, the means 38 for positioning further moves the gripper fingers 34 from the second position shown in FIG. 2 to a third position shown in FIG. 3 over the means 16 for receiving by action of second air powered slide 38b. The expansion of the airbag 12 eliminates wrinkles in the airbag 12 for this final tuckfold. Extendable finger 56 is operated to assist in smoothly folding the tucked corners of the airbag 12. Thereafter, the means 50 for deflating effectively flattens the airbag 12, as further shown in phantom in FIG. 3, and in FIG. 9E, in preparation for further manipulation.

Figure 9E:
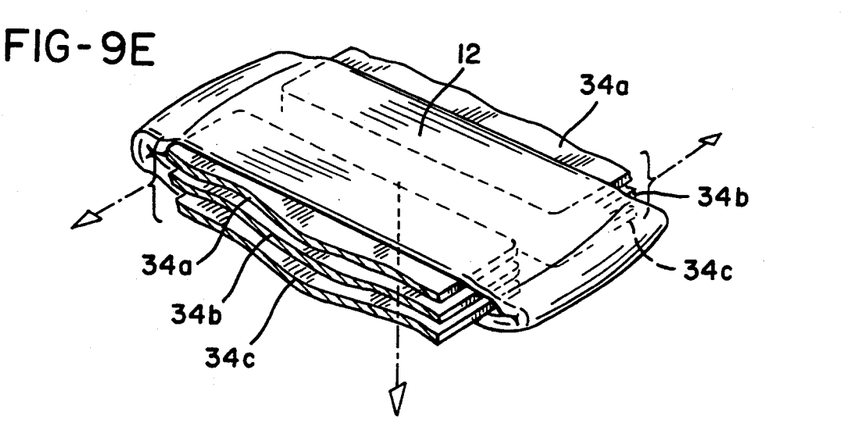
Figure 9F:
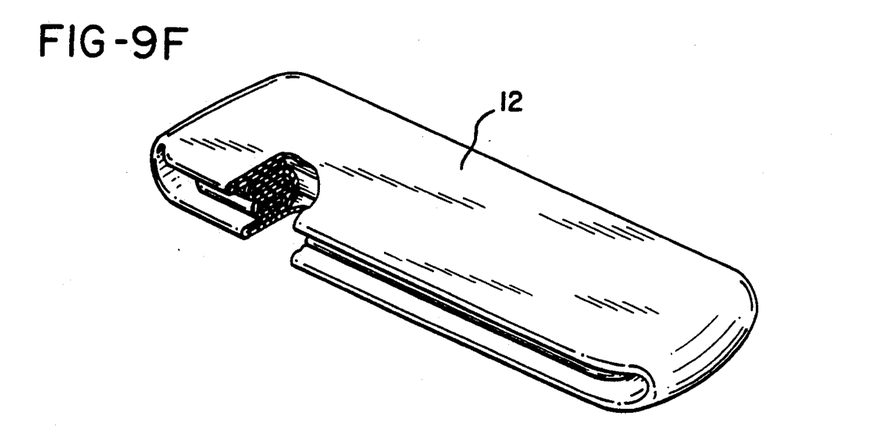
Figure 9G:
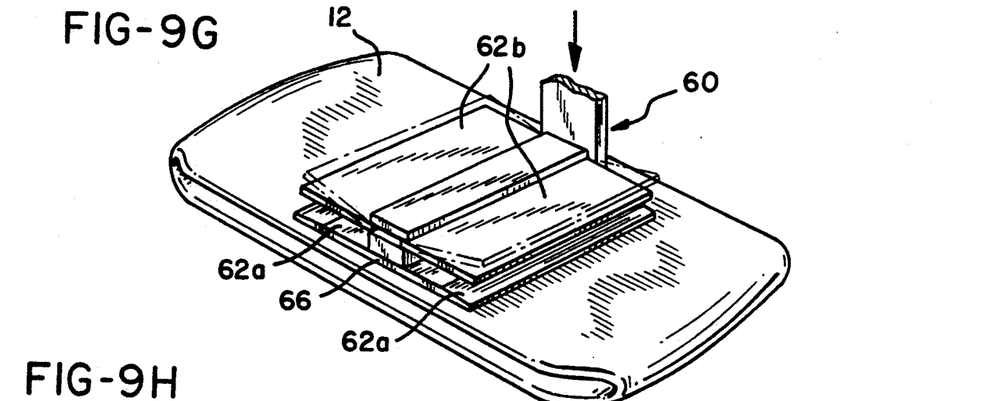

Referring now to FIGS. 4, 5 and 9G, the means for manipulating includes a center hold-down mechanism 60. The center hold-down mechanism 60 has a plurality of hold-down fingers 62 extending in at least one direction therefrom, at least one of which is a movable hold-down finger 62b to receive at least a portion of the airbag 12. Preferably, one fixed hold-down finger 62a and one movable hold-down finger 62b extend in opposite directions from the center hold-down mechanism 60. Shown in FIGS. 4 and 5, means 64 for positioning the center hold-down mechanism 60 are provided to maintain the center hold-down mechanism 60 in contact with a portion of the airbag 12 which is thereby held stationary. As may be understood from FIG. 2, preferably, the means 64 for positioning moves laterally and extends from a position generally above and to the side of the means 16 for receiving to contact one surface of the airbag 12 opposite the means 16 for receiving. The center hold-down mechanism 60 may further include a plate 66 which serves as additional means for deflating, which plate 66 is connected to the center hold-down mechanism 60 and compresses at least a portion of the airbag 12 against the means 16 for receiving to express air from the airbag 12.

Figure 6:
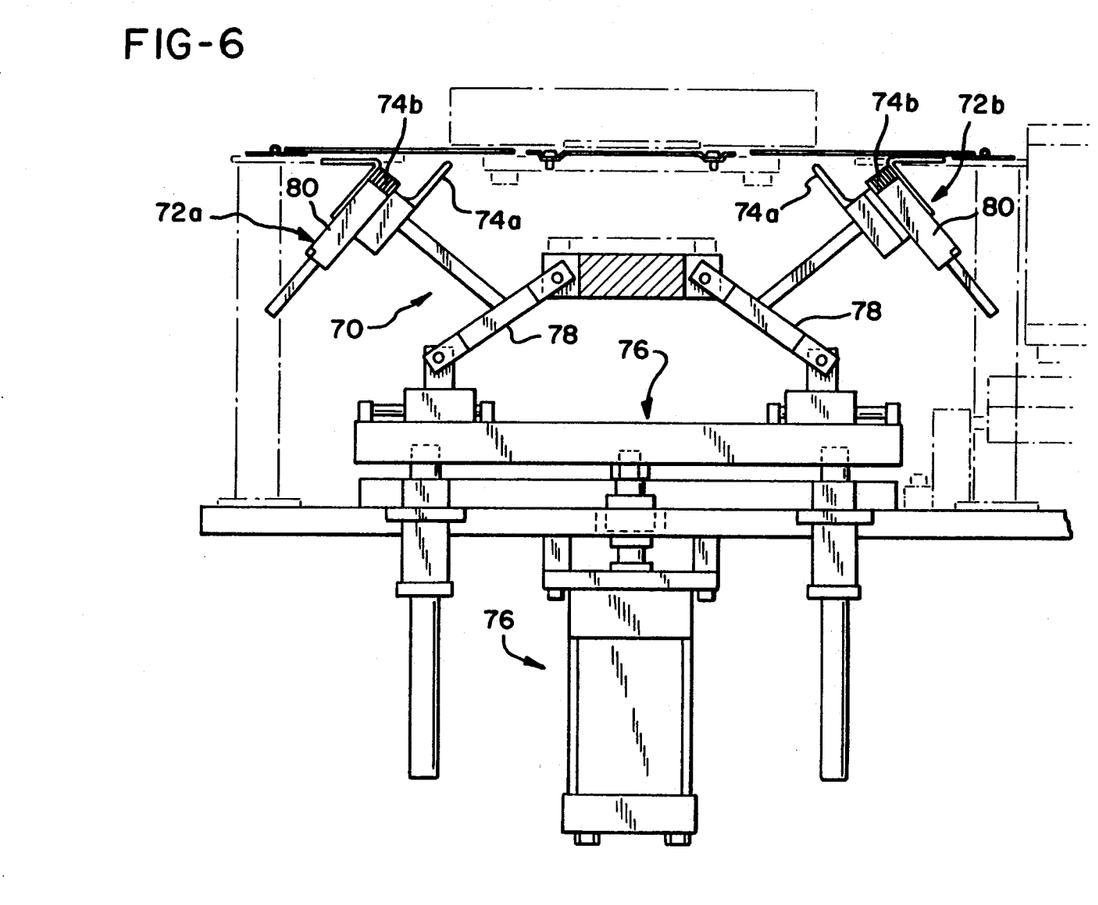
FIG. 6 is a detail side elevational view of the means for folding over of the present invention in a first, retracted position taken along line 6—6 in FIG. 1.
Figure 7:
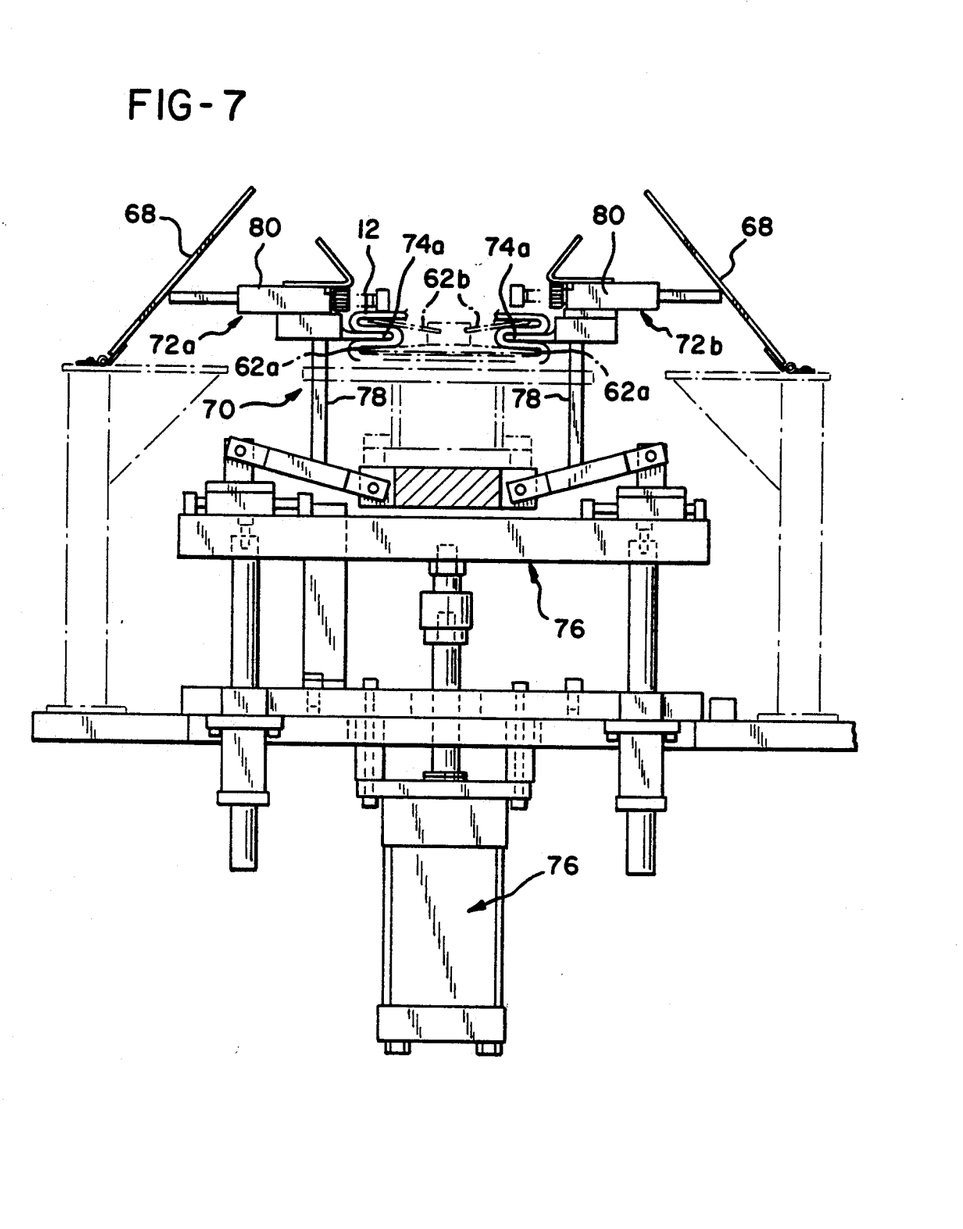
FIG. 7 is a detail side elevational view of the means for folding over of the present invention in a second, extended position taken along line 6—6 in FIG. 1.
Figure 10:
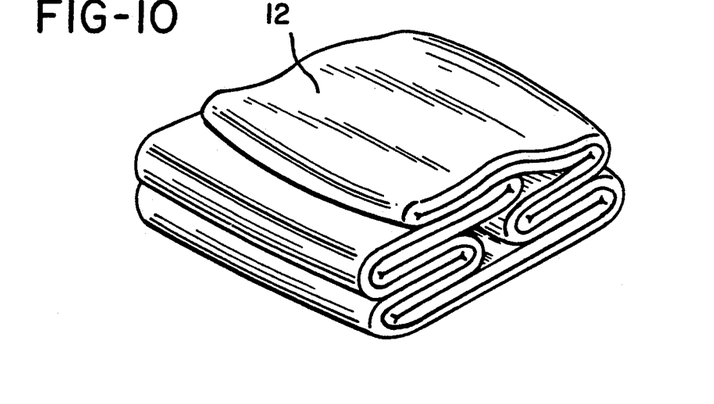
FIG. 10 is a perspective view of an airbag folded in accordance with the preferred embodiments of the present invention.

Referring now to FIGS. 6 and 7, the means for manipulating further preferably includes at least one means 70 for folding over an airbag 12. The means 70 for folding over comprises at least one fold finger assembly 72 having at least one fixed fold finger 74a, at least one extendable fold finger 74b, and means 76 for operating the fold finger assembly 72 to contact the opposite side of the airbag 12 and coact with the hold-down mechanism 60 to fold a portion of the airbag 12. Preferably, two fold finger assemblies 72a and 72b are provided to operate in third and fourth directions, and fold over two generally opposing portions 12c, 12d of the airbag 12, respectively, so that one portion at least partially overlaps the other portion, as seen in FIG. 10.

Figures 9H, 9I:
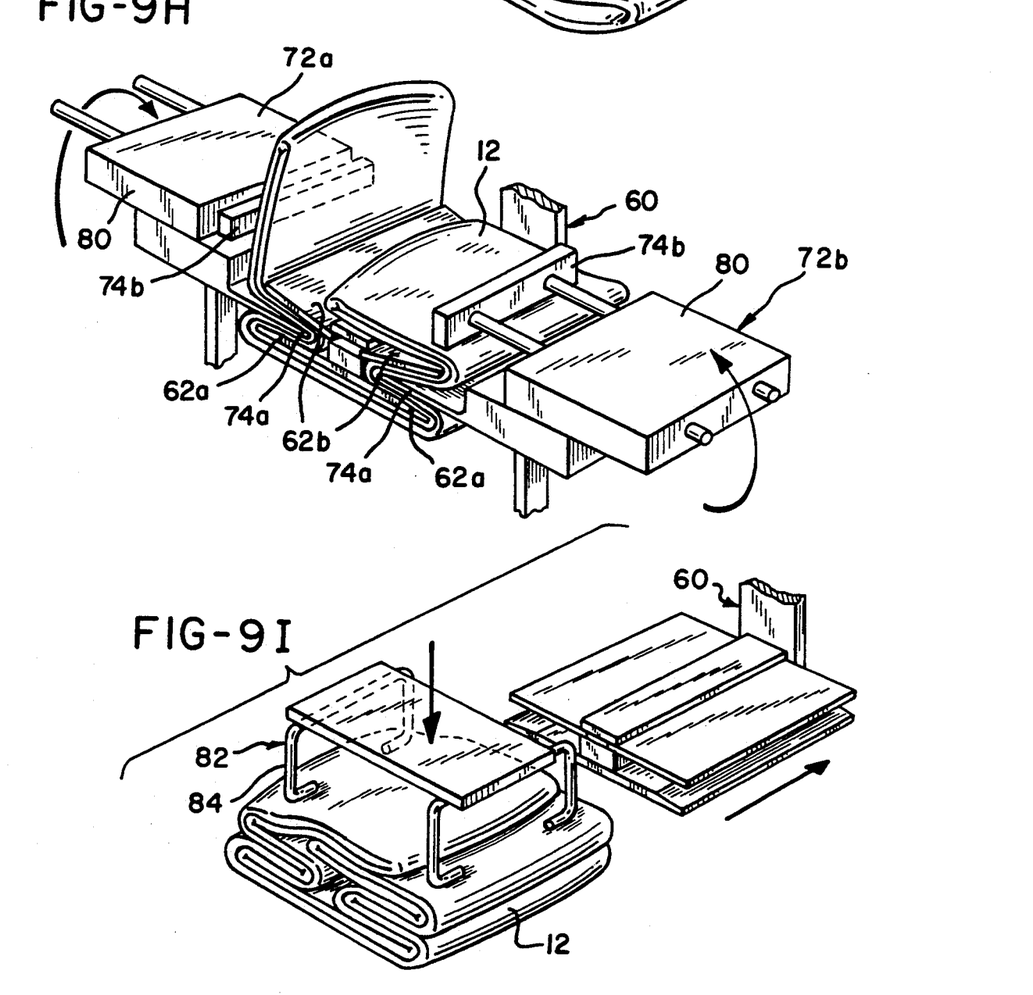

As shown in FIG. 6, each fold finger assembly 72 is retracted below a portion of the airbag 12 in a first position. In FIGS. 7 and 9H, the means 76 for operating the fold finger assembly 72 includes means 78 for inserting the fixed fold finger 74a between the fixed and movable hold-down fingers 62a and 62b to tuck a portion of the airbag 12 into the hold-down mechanism 60. Preferably, as shown, the means 78 for inserting is rotatable upward, to push the fold finger assembly 72 through a flap 68 to so insert the fixed fold finger 74a. The portion of the airbag 12 adjacent to the tuck thus formed is, preferably, maintained generally stationary by the means 16 for receiving. The means 76 for operating the fold finger assembly 72 further includes means 80 for extending the extendable fold finger 74b to further fold the portion of the airbag 12 adjacent to the stationary portion over the movable hold-down finger 62b towards the hold-down mechanism 60. Preferably, the means 80 for extending is an air powered slide.

Figure 8:
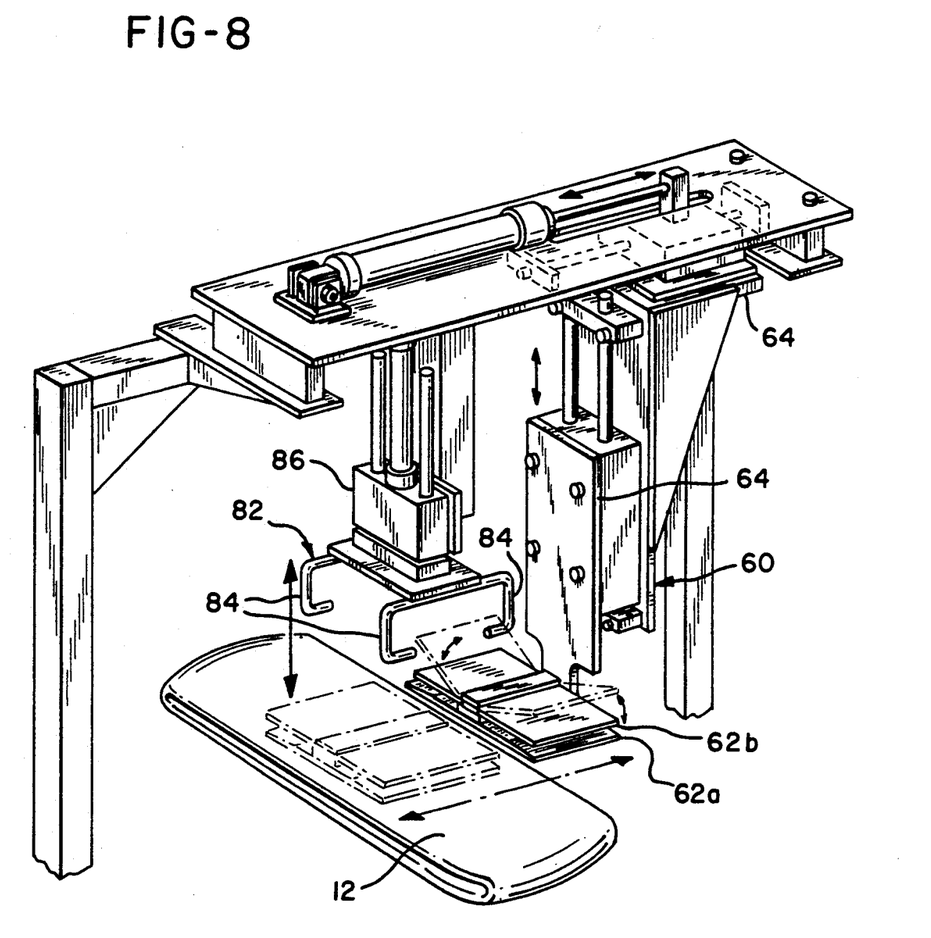
FIG. 8 is a detail perspective view of the hold-down cage of the present invention.

As further shown in FIGS. 8 and 9I, the means for manipulating further includes a second center hold-down mechanism which is a movable cage 82 having a plurality of open hold-down fingers 84 extending in a direction towards the airbag 12. The cage 82, thus, has a generally central open volume to receive a portion of the airbag 12 in folded condition between the open hold-down fingers 84. Means 86 for positioning the second center hold-down mechanism, the cage 82, over an airbag 12 in folded condition are further shown in FIG. 2 positioned generally above the means 16 for receiving. The means 86 for positioning position the cage 82 to maintain the airbag 12 in folded condition while the hold-down mechanism 60 is automatically retracted. Preferably, the cage 82 is operable automatically to enter in position over the folded airbag 12f, and is operable upwards manually by an operator who performs a quality check of the folding and removes the folded airbag 12f from the means 16 for receiving.

Commercially available air cylinders and air-powered slides are preferred throughout the present invention for automatic operation of apparatus elements for cleanliness, weight, size, cost and ease of use.

In a further aspect of the present invention, a method for folding an airbag 12 is provided including the steps of positioning an airbag 12 securely over means 16 for receiving, automatically manipulating a plurality of portions of the airbag 12 in a plurality of directions, respectively, to place the airbag 12 in a folded condition, and removing the airbag 12 in folded condition from the means 16 for receiving for use in a vehicle.

Shown in FIG. 9A, the step of positioning an airbag 12 securely over means 16 for receiving includes clamping a portion of the airbag 12 comprising a mounting flange to the means 16 for receiving.

The step of automatically manipulating can include several individual steps or combinations thereof. In particular, the step of automatically manipulating preferably includes automatically fanfolding first and second portions 12a and 12b of the airbag 12 inward in first and second directions, respectively, generally towards the means 16 for receiving. As well, the step of automatically manipulating preferably further includes automatically folding over third and fourth portions 12c and 12d of the airbag 12 towards the means 16 for receiving in third and fourth directions, respectively.

The step of automatically fanfolding first and second portions of the airbag 12 may be understood with greater specificity by reference to FIGS. 1-3 and 9B-9F. The step of automatically fanfolding first and second portions begins by automatically engaging opposite first and second portions 12a and 12b of the airbag 12 with the first and second gripper finger assemblies 32a and 32b, respectively. As shown in FIGS. 2 and 9B, at each portion of the bag to be engaged, the step of engaging preferably calls for automatically positioning the gripper finger assembly, which has a plurality of gripper fingers 34, and at least one opposing finger 36, on opposite sides of the portion of the airbag 12 to be engaged, and automatically inserting the plurality of gripper fingers 34 into alternating relationship with the at least one opposing finger 36, such that a portion of the airbag 12 is in a fanfolded position therebetween, as illustrated in FIG. 2. Thereafter, the step of engaging is completed by automatically closing the gripper fingers 34 over those portions of the airbag 12, withdrawing the opposing finger 36, and further clamping the gripper fingers 34 over the airbag 12 such that the portions 12a and 12b are in a fanfolded condition.

Once the opposite first and second portions 12a and 12b of the airbag 12 are engaged, the step of automatically fanfolding further includes at least partially inflating the airbag 12, and moving the first and second portions of the airbag 12 inward in the first and second directions generally towards the means 16 for receiving with the respective first and second gripper finger assemblies 32a, 32b, as shown in FIGS. 3, 9C and 9D. This produces a further tuckfold in the airbag 12. Thereafter, the steps of deflating the airbag 12, and disengaging the first and second gripper finger assemblies 32a, 32b are performed, as shown in FIG. 9E. The step of deflating the airbag 12 preferably includes both venting the airbag 12 with the automatic vent valve 52, and evacuating the airbag 12 with vacuum source 54 to maintain the first and second portions of the airbag 12 in a fanfolded position by vacuum on the means 16 for receiving. Prior to deflating the airbag 12, it is further preferred to perform the step of extending an extendable finger 56 along at least one of the first and second gripper finger assemblies 32a and 32b, to lengthen the tuckfold formed by the gripper finger 34a, prior to the step of deflating the airbag 12. It is desirable to provide at least four extendable fingers 56, two on each gripper finger assembly, at opposite ends thereof, so that the step of extending slightly lengthens and smooths out the tuckfold along gripper finger 34a in both directions on both portions 12a, 12b of the airbag 12, as shown in FIG. 9D.

The step of automatically folding over third and fourth portions of an airbag 12 is preferably performed by folding over opposite portions of the airbag 12 towards the means 16 for receiving generally in third and fourth directions, as shown in FIG. 7. As may be understood with greater specificity by reference to FIGS. 5, 7, 9H, 9I and 11, the step of automatically folding over third and fourth portions 12c, 12d of the airbag 12 includes automatically positioning the center hold-down mechanism 60 over the airbag 12, generally over the means 16 for receiving, such that the third and fourth portions 12c, 12d are positioned on opposite sides of the center hold-down mechanism 60, folding over a third portion 12c of the airbag 12 towards the center hold-down mechanism 60, and engaging the third portion 12c of the airbag 12, at least in part, in the center hold-down mechanism 60 to maintain the third portion 12c in a folded position. The step of automatically folding over further includes folding over a fourth portion 12d of the airbag 12 towards the center hold-down mechanism 60, and engaging the fourth portion 12d, at least in part, in the center hold-down mechanism 60 to maintain the fourth portion 12d in folded position. The step of engaging the third portion 12c of the airbag 12 in the center hold-down mechanism 60 preferably includes tucking a part of that third portion 12c into the center hold-down mechanism 60, and then folding the remaining end part of the third portion 12c over the tucked part thereof. Similarly, the step of engaging the fourth portion in the center hold-down mechanism 60 includes tucking a part of the fourth portion 12d of the airbag 12 into the center hold-down mechanism 60, and further folding the remaining end part of that fourth portion 12d over the tucked part thereof.

After the step of manipulating the airbag 12 is performed, it is preferred that the method for folding an airbag 16 further include the step of automatically positioning the hold-down cage 82 over the folded airbag 12f to maintain the plurality of portions thereof in a folded condition. At this point, the hold-down mechanism 60 is retracted, and the automatic clamping means 28 released.

Removal of the folded airbag 12f is preferably performed by manually raising the cage 82 and removing the airbag from the means 16 for receiving. Because the folded airbag 12f requires inspection as a quality assurance step, manual removal of the airbag 12 at this point enables both inspection and correction of any minor misfolding, as well as reinsertion and refolding of misfolded airbags 12. Alternatively, automatic removal of the airbag 12 may be performed, but is not preferred.

The present invention, thus, further provides a method whereby fanfolding and folding over of portions of an airbag 12 may be achieved. While the preferred embodiment includes only the steps of fanfolding and folding over, the method steps disclosed in accordance with the present invention may be variously combined to automatically prepare airbags 12 of various types in various folding patterns.

While certain representative embodiments and details have been shown for purposes of illustrating the present invention, it will be apparent to those skilled in the art that various changes in the apparatus and method disclosed herein may be made without departing from the scope of the invention, which is defined in the appended claims.

What is claimed is:

1. A method for folding an airbag comprising the steps of:
 positioning an airbag securely over a means for receiving;
 automatically manipulating a plurality of portions of said airbag in a plurality of directions, respectively, to produce an airbag in folded conditions, by:
  automatically fanfolding first and second portions of said airbag inward in first and second directions, respectively, generally towards said means for receiving, and
  automatically folding over third and fourth portions of said airbag towards said means for receiving in third and fourth directions, respectively, by automatically performing steps comprising:

positioning a center hold-down mechanism having a plurality of hold-down fingers extending in at least one direction therefrom over said airbag generally over said means for receiving and in contact with a stationary portion of the airbag on one surface of the airbag such that said third and fourth portions are positioned on opposite sides of said center hold-down mechanism;

folding over said third portion towards said center hold-down mechanism by pivoting a fold finger assembly having at least one fixed fold finger and at least one extendable fold finger into contact with the opposite surface of the airbag to coact with the center hold-down fingers;

engaging a part of the said third portion in said center hold-down mechanism to maintain with said fixed fold finger and engaging a second part of the third portion by extending the extendable fold finger to coact with the center hold-down finger mechanism said third portion in a folded position;

folding over said fourth portion towards said center hold-down mechanism engaging said fourth portion, at least in part, in said center hold-down mechanism to maintain said fourth portion in folded position; and removing said airbag in folded condition from said means for receiving.

2. The method for folding an airbag of claim 1 wherein:

said step of engaging said third portion in said center hold-down mechanism includes tucking a part of said third portion of said airbag into said center hold-down mechanism, and further folding the remaining end part of said third portion over said tucked part thereof; and said step of engaging said fourth portion in said center hold-down mechanism includes tucking a part of said fourth portion of said airbag into said center hold-down mechanism, and further folding the remaining end part of said fourth portion over said tucked part thereof.

3. The method for folding an airbag of claim 1 wherein:

said step of automatically fanfolding first and second portions comprises automatically:

engaging opposite first and second portions of said airbag with first and second gripper finger assemblies, respectively;

at least partially inflating said airbag;

moving said first and second portions of said airbag inward in said first and second directions generally towards said means for receiving with said respective first and second gripper finger assemblies;

deflating said airbag; and disengaging said first and second gripper finger assemblies.

4. The method for folding an airbag of claim 3 wherein said step of engaging opposite first and second portions of said airbag with said first and second gripper finger assemblies, respectively, comprises, at each said portion, automatically:

positioning a gripper finger assembly having a plurality of gripper fingers, and at least one opposing finger on opposite sides of said portion of said airbag;

automatically inserting said plurality of gripper fingers into interdigitated relationship with said at least one opposing finger, such that said portion of said airbag is in a fanfolded position therebetween;

closing said plurality of gripper fingers over said portion of said airbag;

withdrawing said at least one opposing finger; and clamping said gripper fingers over said airbag such that said portion is in a fanfolded condition.

5. The method for folding an airbag of claim 3 further comprising the step of extending an extendable finger relative to at least one of said first and second gripper finger assemblies to smooth out the tuckfold formed by said at least one gripper finger prior to said step of deflating said airbag.

6. The method for folding an airbag of claim 3 wherein said step of deflating said airbag comprises automatically:

venting said airbag; and evacuating said airbag to maintain said first and second portions of said airbag in a fanfolded position.

7. An apparatus for folding an airbag comprising:

a frame;

means for receiving an airbag disposed in said frame;

means for manipulating a plurality of portions of said airbag in a plurality of directions, respectively, to automatically produce an airbag in folded condition, including:

a center hold-down mechanism having a plurality of hold-down fingers extending in at least one direction therefrom, wherein at least one of said hold-down fingers is a movable hold-down finger to receive at least a portion of said airbag;

means for positioning said center hold-down mechanism in contact with a stationary portion of said airbag on one surface of said airbag; and at least one means for folding over an airbag, said means for folding over comprising:

a fold finger assembly having at least one fixed fold finger and having at least one extendable fold finger;

means for operating said fold finger assembly to contact the opposite side of said airbag and coact with said hold-down mechanism to fold said portion of airbag; and processor means for automatically operating said means for manipulating to produce a folded airbag.

8. The apparatus for folding of claim 7 wherein said means for operating said fold finger assembly includes:

means for inserting said fixed fold finger between said two hold-down fingers to tuck a portion of said airbag adjacent to said stationary portion into said hold-down mechanism; and means for extending said extendable fold finger to further fold said portion of said airbag adjacent to said stationary portion towards said hold-down mechanism.

9. The apparatus for folding of claim 7 wherein said means for manipulating includes two separate means for folding over respective generally opposing portions of said airbag, such that one portion is folded to at least partially overlap the other portion.

10. The apparatus for folding of claim 7 wherein said means for manipulating further comprises:

first and second means for fanfolding generally opposing first and second portions of an airbag generally in first and second directions, respectively, towards said means for receiving, each of said first and second means for fanfolding comprising:

a gripper finger assembly having a plurality of gripper fingers;

at least one opposing finger in opposing relationship with said gripper finger assembly;

means for positioning said gripper assembly along an axis to insert said plurality of gripper fingers into interdigitated relationship with said at least one opposing finger, and engage a portion of an airbag in a fanfolded position therebetween;

means for closing at least one of said fingers in said gripper finger assembly over said portion of an airbag to maintain said fanfolded position; and means for moving said at least one opposing finger along another axis into and out of opposing relationship with said gripper finger assembly;

means for inflating said airbag; and means for deflating said airbag.

11. The apparatus for folding of claim 10 wherein said fingers of said gripper finger assembly and said opposing fingers comprise generally parallel plates extending generally along the length of a portion of said airbag.

12. The apparatus for folding of claim 10 wherein said gripper finger assembly further comprises at least one extendable finger, and means for extending said at least one extendable finger relative to one of said fingers of said gripper finger assembly to smooth out the tuckfold formed by said finger.

13. The apparatus for folding of claim 10 wherein said means for receiving an airbag comprises:

a receiving plate including an aperture connecting to said means for inflating and means for deflating; and automatic means for clamping that portion of an airbag which includes an opening into the interior of said airbag;

whereby said airbag may be securely positioned, and automatically inflated and deflated.

14. The apparatus for folding of claim 10 wherein said means for fanfolding includes:

three gripper fingers in said gripper finger assembly, including a centrally located, fixed gripper finger and two movable gripper fingers operable with said means for closing; and two opposing fingers in opposing relationship with said gripper finger assembly.

* * * * *